United States Patent
Chen et al.

(10) Patent No.: US 10,135,598 B2
(45) Date of Patent: Nov. 20, 2018

(54) JOINT PARAMETER DETERMINATION AND SEPARATE CQI GENERATION REPORTING FOR LTE-A MULTICARRIER

(75) Inventors: Wanshi Chen, San Diego, CA (US); Jelena M. Damnjanovic, Del Mar, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1055 days.

(21) Appl. No.: 12/797,542

(22) Filed: Jun. 9, 2010

(65) Prior Publication Data
US 2011/0134771 A1    Jun. 9, 2011

Related U.S. Application Data (60) Provisional application No. 61/185,913, filed on Jun. 10, 2009.

(51) Int. Cl.
| | |
|---|---|
| *H04W 4/00* | (2018.01) |
| *H04L 5/00* | (2006.01) |
| *H04L 1/00* | (2006.01) |
| *H04W 24/10* | (2009.01) |

(52) U.S. Cl.
CPC .......... *H04L 5/0057* (2013.01); *H04L 1/0027* (2013.01); *H04L 1/0028* (2013.01); *H04L 5/0007* (2013.01); *H04W 24/10* (2013.01)

(58) Field of Classification Search
CPC ... H04L 1/0026; H04L 5/0057; H04B 7/0626; H04B 7/066
See application file for complete search history.

(56) References Cited

U.S. PATENT DOCUMENTS

| | | | | |
|---|---|---|---|---|
| 7,149,527 | B2* | 12/2006 | Chen et al. | 455/452.1 |
| 2006/0165188 | A1* | 7/2006 | Wunder | H04L 1/0003 375/260 |
| 2006/0274712 | A1* | 12/2006 | Malladi et al. | 370/345 |
| 2007/0054689 | A1* | 3/2007 | Baker | H04L 1/0026 455/522 |
| 2008/0305745 | A1* | 12/2008 | Zhang | H04L 1/0026 455/67.11 |
| 2009/0046569 | A1 | 2/2009 | Chen et al. | |

(Continued)

FOREIGN PATENT DOCUMENTS

| | | |
|---|---|---|
| CN | 101366306 A | 2/2009 |
| CN | 101409883 A | 4/2009 |

(Continued)

OTHER PUBLICATIONS

ETSI TS 136 213 V8.8.0 ("LTE—Evolved Universal Terrestrial Radio Access (E--UTRA)—Physical layer procedures"), Oct. 2009, pp. 37-40. (Year: 2009).*

(Continued)

*Primary Examiner* — Kevin C. Harper
(74) *Attorney, Agent, or Firm* — Holland & Hart LLP (57) ABSTRACT

Certain aspects of the present disclosure relate to a method for determining and reporting channel information feedback for multi-carrier operation. In one aspect, channel information feedback parameters may be determined jointly across component carriers, and channel information feedback reports may be generated and reported individually per component carrier.

41 Claims, 6 Drawing Sheets

(56) References Cited

U.S. PATENT DOCUMENTS

| | | | |
|---|---|---|---|
| 2009/0046647 A1* | 2/2009 | Roh et al. ..................... 370/329 |
| 2009/0116570 A1 | 5/2009 | Bala et al. |
| 2009/0207784 A1* | 8/2009 | Lee, II .................. H04B 7/063 |
| | | | 370/328 |
| 2009/0279445 A1 | 11/2009 | Nogami et al. |
| 2010/0098012 A1* | 4/2010 | Bala ........................ H04L 5/001 |
| | | | 370/329 |
| 2011/0034198 A1* | 2/2011 | Chen ..................... H04L 1/0029 |
| | | | 455/509 |
| 2011/0255469 A1 | 10/2011 | Kishiyama et al. |
| 2011/0305211 A1* | 12/2011 | Lunttila ............... H04L 5/0092 |
| | | | 370/329 |
| 2012/0008587 A1* | 1/2012 | Lee, II .................. H04L 1/0041 |
| | | | 370/329 |

FOREIGN PATENT DOCUMENTS

| | | |
|---|---|---|
| EP | 2230786 A1 | 9/2010 |
| JP | 2010074754 A | 4/2010 |
| KR | 20090054878 A | 6/2009 |
| WO | 2007072828 A1 | 6/2007 |
| WO | 2009020110 A1 | 2/2009 |
| WO | 2009022811 A1 | 2/2009 |
| WO | WO2009028819 A2 | 3/2009 |
| WO | WO2010048142 A1 | 4/2010 |

OTHER PUBLICATIONS

Huawei: "PUCCH design for carrier aggregation", 3GPP Draft; R1-090813, 3rd Generation Partnership Project (3GPP), Mobile Competence Centre ; 650, Route Des Lucioles ; F-06921 Sophia-Antipolis Cedex ; France, No. Athens, Greece; 20090203, Feb. 3, 2009 (Feb. 3, 2009), XP050318670, [retrieved on Feb. 3, 2009].

International Search Report and Written Opinion—PCT/US2010/038210—International Search Authority, European Patent Office, Dec. 8, 2010.

Taiwan Search Report—TW099118959—TIPO—Jun. 9, 2013.

Qualcomm Europe, "Clarifying UE-Selected Subband CQI Report on PUCCH," 3GPP TSG-RAN WG1 Meeting #54, R1-083180, Jeju, Korea, Aug. 18-22, 2008, 6 pgs., XP050316611, 3rd Generation Partnership Project.

* cited by examiner

JOINT PARAMETER DETERMINATION AND SEPARATE CQI GENERATION REPORTING FOR LTE-A MULTICARRIER

CLAIM OF PRIORITY UNDER 35 U.S.C. § 119

The present Application for Patent claims benefit of Provisional Application Ser. No. 61/185,913 filed Jun. 10, 2009 and assigned to the assignee hereof and hereby expressly incorporated by reference herein.

BACKGROUND

Field

Certain aspects of the present disclosure generally relate to wireless communications and, more particularly, to a method for communication of feedback information in advanced wireless communication systems.

Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

SUMMARY

Certain aspects provide a method for reporting channel quality in a multiple carrier system. The method generally includes receiving one or more channel information feedback reporting parameters, the channel information feedback reporting parameters determined based on a total downlink (DL) bandwidth of a plurality of DL component carriers associated with at least one uplink (UL) component carrier, generating one or more channel information feedback reports for the DL component carriers, wherein each channel information feedback report is generated in accordance with the one or more channel information feedback reporting parameters, and transmitting the one or more channel information feedback reports to an eNodeB on the at least one UL component carrier.

Certain aspects provide an apparatus for reporting channel quality in a multiple carrier system. The apparatus generally includes logic for receiving one or more channel information feedback reporting parameters, the channel information feedback reporting parameters determined based on a total downlink (DL) bandwidth of a plurality of DL component carriers associated with at least one uplink (UL) component carrier, logic for generating one or more channel information feedback reports for the DL component carriers, wherein each channel information feedback report is generated in accordance with the one or more channel information feedback reporting parameters, and logic for transmitting the one or more channel information feedback reports to an eNodeB on the at least one UL component carrier.

Certain aspects provide an apparatus for reporting channel quality in a multiple carrier system. The apparatus generally includes means for receiving one or more channel information feedback reporting parameters, the channel information feedback reporting parameters determined based on a total downlink (DL) bandwidth of a plurality of DL component carriers associated with at least one uplink (UL) component carrier, means for generating one or more channel information feedback reports for the DL component carriers, wherein each channel information feedback report is generated in accordance with the one or more channel information feedback reporting parameters, and means for transmitting the one or more channel information feedback reports to an eNodeB on the at least one UL component carrier.

Certain aspects provide a computer-program product for reporting channel quality in a multiple carrier system, comprising a computer readable medium having instructions stored thereon, the instructions being executable by one or more processors. The instructions generally include instructions for receiving one or more channel information feedback reporting parameters, the channel information feedback reporting parameters determined based on a total downlink (DL) bandwidth of a plurality of DL component carriers associated with at least one uplink (UL) component carrier, instructions for generating one or more channel information feedback reports for the DL component carriers, wherein each channel information feedback report is generated in accordance with the one or more channel information feedback reporting parameters, and instructions for transmitting the one or more channel information feedback reports to an eNodeB on the at least one UL component carrier.

Certain aspects provide an apparatus for reporting channel quality in a multiple carrier system, comprising at least one processor and a memory coupled to the at least one processor. The process is generally configured to receive one or more channel information feedback reporting parameters, the channel information feedback reporting parameters determined based on a total downlink (DL) bandwidth of a plurality of DL component carriers associated with at least one uplink (UL) component carrier, generate one or more channel information feedback reports for the DL component carriers, wherein each channel information feedback report is generated in accordance with the one or more channel information feedback reporting parameters, and transmit the one or more channel information feedback reports to an eNodeB on the at least one UL component carrier.

Certain aspects provide a method for reporting channel quality in a multiple carrier system. The method generally includes determining one or more channel information feedback reporting parameters based on a total downlink (DL) bandwidth of a plurality of DL component carriers associated with at least one uplink (UL) component carrier, transmitting the one or more channel information feedback reporting parameters to a UE on the DL component carriers, receiving one or more channel information feedback reports for the DL component carriers, wherein each channel information feedback report is generated in accordance with the one or more channel information feedback reporting parameters, and using the one or more channel information feedback reports for downlink transmission.

Certain aspects provide an apparatus for reporting channel quality in a multiple carrier system. The apparatus generally includes logic for determining one or more channel information feedback reporting parameters based on a total downlink (DL) bandwidth of a plurality of DL component carriers associated with at least one uplink (UL) component carrier, logic for transmitting the one or more channel information feedback reporting parameters to a UE on the DL component carriers, logic for receiving one or more channel information feedback reports for the DL component carriers, wherein each channel information feedback report is generated in accordance with the one or more channel information feedback reporting parameters, and logic for using the one or more channel information feedback reports for downlink transmission.

Certain aspects provide an apparatus for reporting channel quality in a multiple carrier system. The apparatus generally includes means for determining one or more channel information feedback reporting parameters based on a total downlink (DL) bandwidth of a plurality of DL component carriers associated with at least one uplink (UL) component carrier, means for transmitting the one or more channel information feedback reporting parameters to a UE on the DL component carriers, means for receiving one or more channel information feedback reports for the DL component carriers, wherein each channel information feedback report is generated in accordance with the one or more channel information feedback reporting parameters, and means for using the one or more channel information feedback reports for downlink transmission.

Certain aspects provide a computer-program product for reporting channel quality in a multiple carrier system, comprising a computer readable medium having instructions stored thereon, the instructions being executable by one or more processors. The instructions generally include instructions for determining one or more channel information feedback reporting parameters based on a total downlink (DL) bandwidth of a plurality of DL component carriers associated with at least one uplink (UL) component carrier, instructions for transmitting the one or more channel information feedback reporting parameters to a UE on the DL component carriers, instructions for receiving one or more channel information feedback reports for the DL component carriers, wherein each channel information feedback report is generated in accordance with the one or more channel information feedback reporting parameters, and instructions for using the one or more channel information feedback reports for downlink transmission.

Certain aspects provide an apparatus for reporting channel quality in a multiple carrier system, comprising at least one processor and a memory coupled to the at least one processor. The processor is generally configured to determine one or more channel information feedback reporting parameters based on a total downlink (DL) bandwidth of a plurality of DL component carriers associated with at least one uplink (UL) component carrier, transmit the one or more channel information feedback reporting parameters to a UE on the DL component carriers, receive one or more channel information feedback reports for the DL component carriers, wherein each channel information feedback report is generated in accordance with the one or more channel information feedback reporting parameters, and use the one or more channel information feedback reports for downlink transmission.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as NodeB, Radio Network Controller ("RNC"), evolved NodeB or eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment ("UE"), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Figure 1:
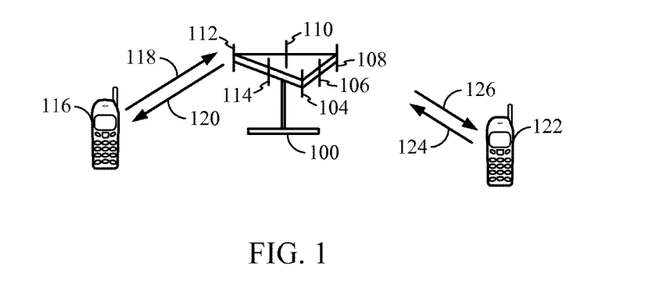
FIG. 1 illustrates an example multiple access wireless communication system in accordance with certain aspects of the present disclosure.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure, each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
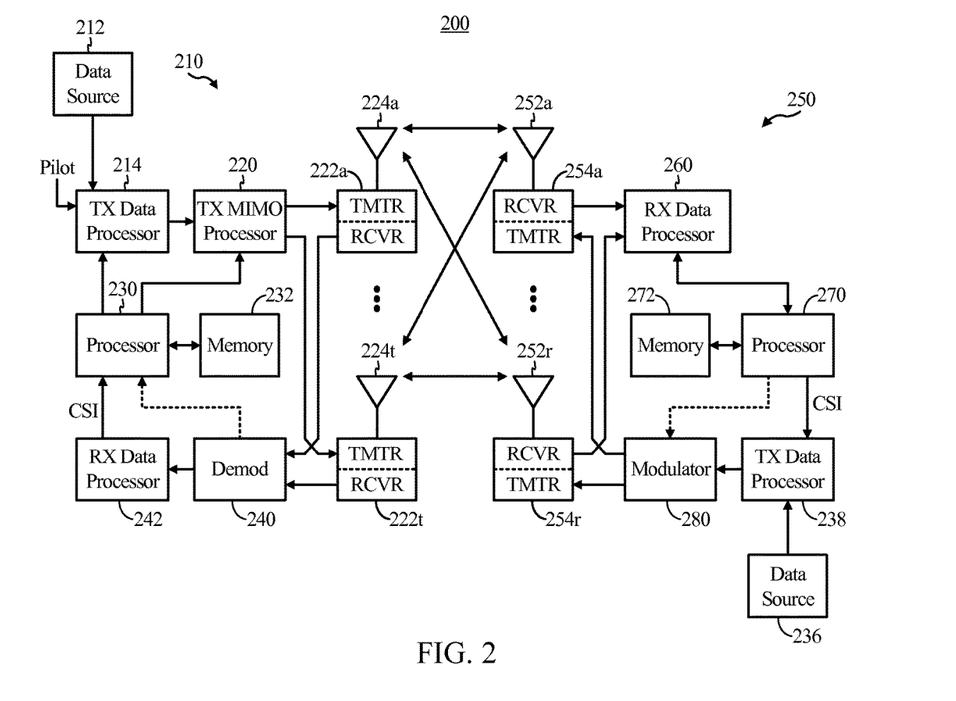
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250. Processor 230 then determines which pre-coding matrix to use for determining the beamforming weights, and then processes the extracted message.

Figure 3:
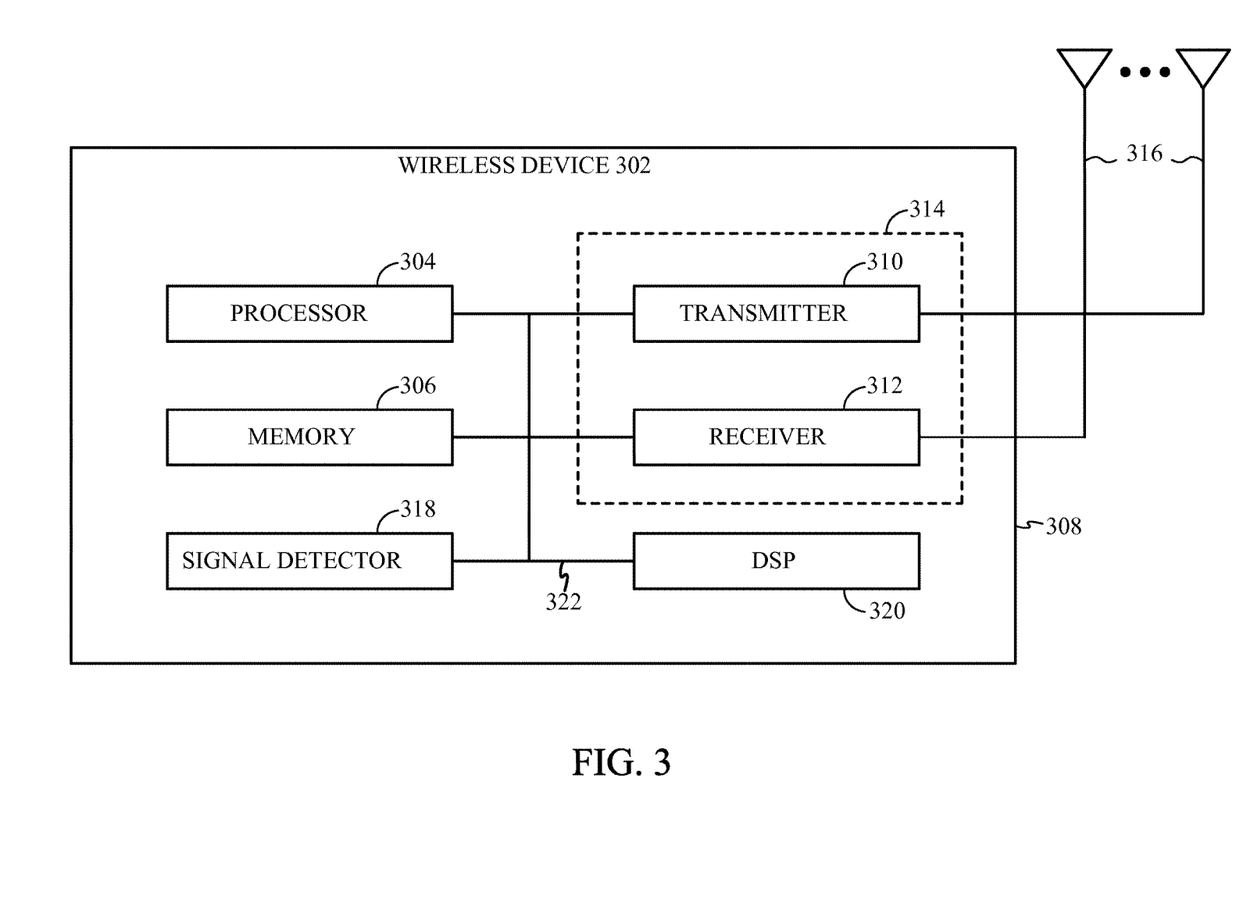
FIG. 3 illustrates various components that may be utilized in a wireless device in accordance with certain aspects of the present disclosure.

FIG. 3 illustrates various components that may be utilized in a wireless device 302 that may be employed within the wireless communication system illustrated in FIG. 1. The wireless device 302 is an example of a device that may be configured to implement the various methods described herein. The wireless device 302 may be a base station 100 or any of user terminals 116 and 122.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In one aspect of the present disclosure, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be only used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into DL and UL channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels. The DL PHY channels may comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH). The UL PHY Channels may comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

Joint Parameter Determination and Separate CQI Generation and Reporting

An eNodeB may use channel information feedback transmitted by a UE as an indication of downlink channel conditions. In one aspect, channel information feedback may comprise channel quality indicator (CQI) reports. CQI reports generally indicate the data rate supported by the channel, taking into account receiver characteristics of a UE and the Signal-to-Interference Plus Noise Ratio (SINR). In LTE Rel-8, there are two types of CQI reports: periodic and aperiodic. Physical Uplink Control Channel (PUCCH) are used for periodic CQI reporting; Physical Uplink Shared Channel (PUSCH) is used for aperiodic CQI reporting, as the NB specifically instructs a UE to send an individual CQI report in a resource scheduled for uplink data transmission.

For periodic CQI reporting, two types of CQI reports may be configured: (1) wideband feedback and (2) UE-selected sub-band feedback. The eNodeB may configure the type of CQI report requested, as well as other report characteristics such as periodicity and frequency resolution. To provide a wideband report, the UE calculates a wideband CQI value for the whole system bandwidth. To provide a UE-selected sub-band report, the total number of sub-bands N is divided into J portions called "bandwidth parts", each sub-band having a size k. The UE then computes and reports a CQI value corresponding to a reporting opportunity within each bandwidth part (along with the corresponding index of the reported sub-band.) The bandwidth part size J and sub-band size k are dependent upon the size of the system bandwidth, as summarized by Table 1.

TABLE 1

Subband Size (k) and Bandwidth Parts (J) vs. Downlink System Bandwidth

| System Bandwidth $N_{RB}^{DL}$ | Subband Size k (RBs) | Bandwidth Parts (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

It is acknowledged that the bandwidth part sizes and sub-band sizes within a bandwidth part may not necessarily be uniform in size. For example, for a system bandwidth comprising 5 MHz or 25 Resource Blocks (RBs), there are 7 sub-bands: 6 sub-bands having a size of 4 RBs, and 1 sub-band having a size of 1 RB. Furthermore, there are 2 bandwidth parts: the first bandwidth part comprising 4 sub-bands each of 4 RBs, and the second bandwidth part comprising 3 sub-bands (2 of 4 RBs, and 1 of 1 RB.)

For aperiodic reporting, three types of CQI reporting may be configured: (1) wideband feedback (i.e., "mode 1-2"), (2) higher-layer configured feedback (i.e., eNodeB-configured sub-band feedback or "mode 3-0, mode 3-1"), and (3) UE-selected sub-band feedback (i.e., "mode 2-0, mode 2-2"). For wideband reports, a Precoding Matrix Indicator (PMI) may be reported per sub-band. For higher-layer configured reports, CQI-per-sub-band may be reported. The corresponding sub-band size k for a given total system bandwidth for wideband and higher-layer configured reports is summarized in Table 2 below.

TABLE 2

LTE Rel-8 Sub-band Size (k) vs. System Bandwidth, Modes 1-2, 3-0 and 3-1

| System Bandwidth $N_{RB}^{DL}$ | Sub-band Size (k) |
|---|---|
| 6-7 | NA |
| 8-10 | 4 |
| 11-26 | 4 |
| 27-63 | 6 |
| 64-110 | 8 |

For aperiodic UE-selected sub-band reports, CQI value are computed reflecting the average quality of M preferred sub-bands selected by the UE. In one aspect, the CQI of M preferred sub-bands may be reported (along with an index of the preferred M sub-bands.) The size M and the sub-band size k for a UE-selected sub-band report are summarized in Table 3 below.

TABLE 3

LTE Rel-8 Sub-band Size (k) and Number of Sub-bands (M) vs. Downlink System Bandwidth, Modes 2-0 and 2-2

| System Bandwidth $N_{RB}^{DL}$ | Sub-band Size k (RBs) | M |
|---|---|---|
| 6-7 | NA | NA |
| 8-10 | 2 | 1 |
| 11-26 | 2 | 3 |
| 27-63 | 3 | 5 |
| 64-110 | 4 | 6 |

It is acknowledged that there may be a tradeoff between reporting granularity and reporting overhead. As such, subband size k and other parameters such as preferred sub-bands M are dependent on system bandwidth (i.e. the larger the system bandwidth, the larger the sub-band size.)

It is further acknowledged that, in LTE-Advanced, channel information feedback may be based on channel state information reference signals (CSI-RS) rather than common reference signals (CRS) as found in Rel-8. Moreover, while the present disclosure discusses one embodiment of a method for generating channel information feedback comprising generating CQI reports, it is contemplated that other forms of channel information feedback may be used. In one aspect, channel information feedback may be extended from the LTE Rel-8 approach of using CQI/PMI/RI, to include either explicit or implicit channel information feedback.

In LTE-Advanced, a UE may be configured with multiple component carriers in DL and UL. The configuration of component carriers may be symmetric in DL and UL, in which case, the CQI report configuration may follow the LTE Rel-8 mechanism discussed above. However, it is possible that at least one UL component carrier from the set of UL component carriers is semi-statically configured to carry CQI feedback for all DL carriers. This UL component carrier carrying CQI feedback can be denoted as the UL primary component carrier. In addition, the configuration of component carriers may also be asymmetric in DL and UL. In other words, at least one UL component carrier may be configured to provide channel information feedback for a plurality of DL component carriers. In all these scenarios, the generation and transmission of CQI reports based on parameters such as sub-band size k, bandwidth part J, and preferred sub-bands M, may be performed in a multiple component carrier network configuration.

Figure 4:
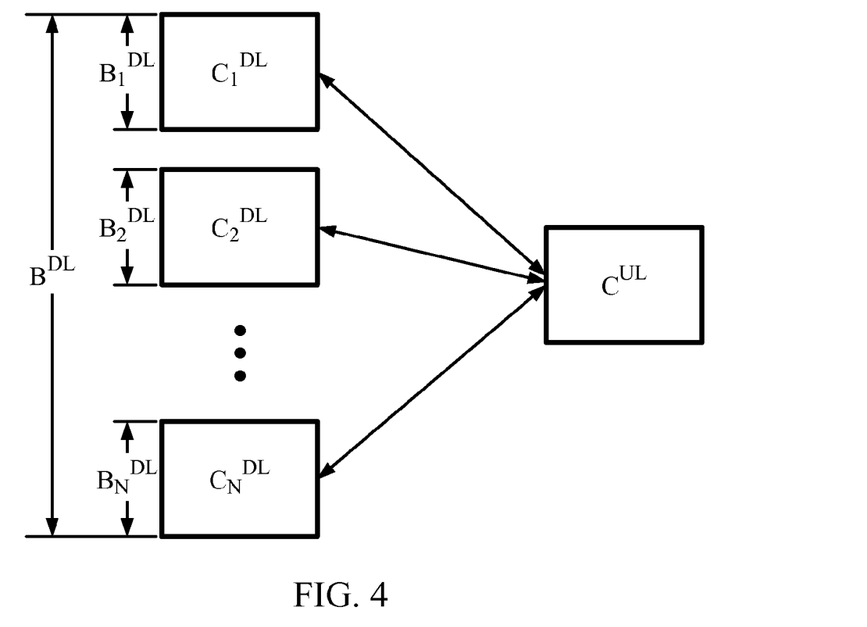
FIG. 4 is a block diagram illustrating exemplary uplink and downlink component carriers in accordance with certain aspects of the present disclosure.
Figure 5:
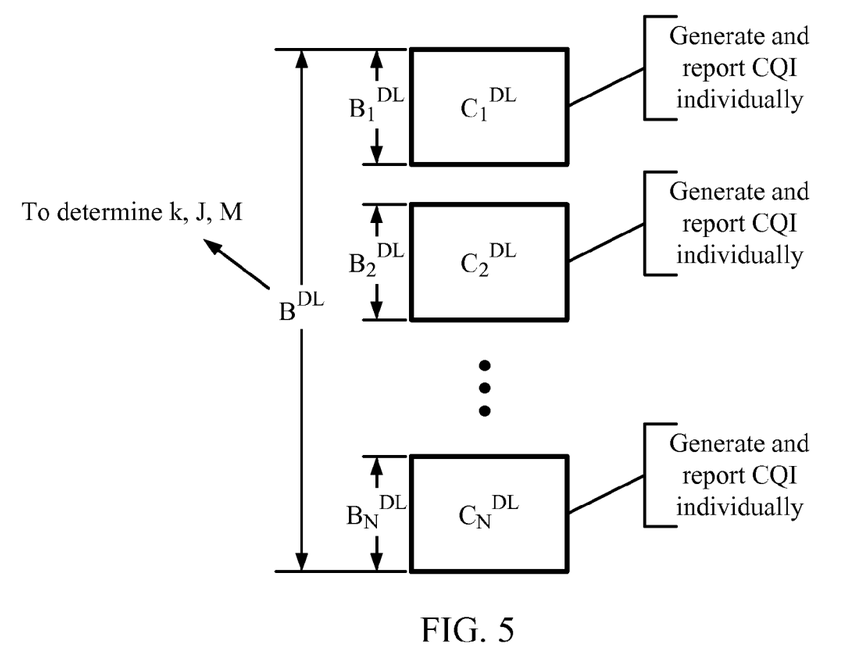
FIG. 5 is another block diagram illustrating exemplary uplink and downlink component carriers in accordance with certain aspects of the present disclosure.

Therefore, aspects of the present disclosure provide a mechanism for CQI report generation for multiple component carrier configurations. In one aspect, multiple symmetric DL and UL component carriers may configured for a UE. In one aspect, multiple DL component carriers may be associated with at least one UL component carrier such that the at least one UL component carrier reports channel information feedback to the multiple DL component carriers. In one aspect, as illustrated in FIG. 4, there may be N component carriers 402 associated with one UL component carrier 404, denoted by $C_n^{DL}$, for n=1, . . . , N. The bandwidth of $C_n^{DL}$ may be denoted as $B_n^{DL}$, and the total DL bandwidth associated with the UL may be denoted as $B^{DL}=B_1^{DL}+ \ldots +B_N^{DL}$. In one aspect, parameters determination may be performed jointly, but CQI generation and reporting may be performed individually. According to one aspect, the CQI report parameters comprising sub-band size k, bandwidth part J, and number of sub-bands for preferred M M, as discussed above, may be determined based on the total DL bandwidth associated with the at least one UL, $B^{DL}$. The generation and transmission of CQI reports (as well as PMI and Rank Indicator), may be performed on a per DL component carrier basis, as illustrated by FIG. 5.

Figure 6:
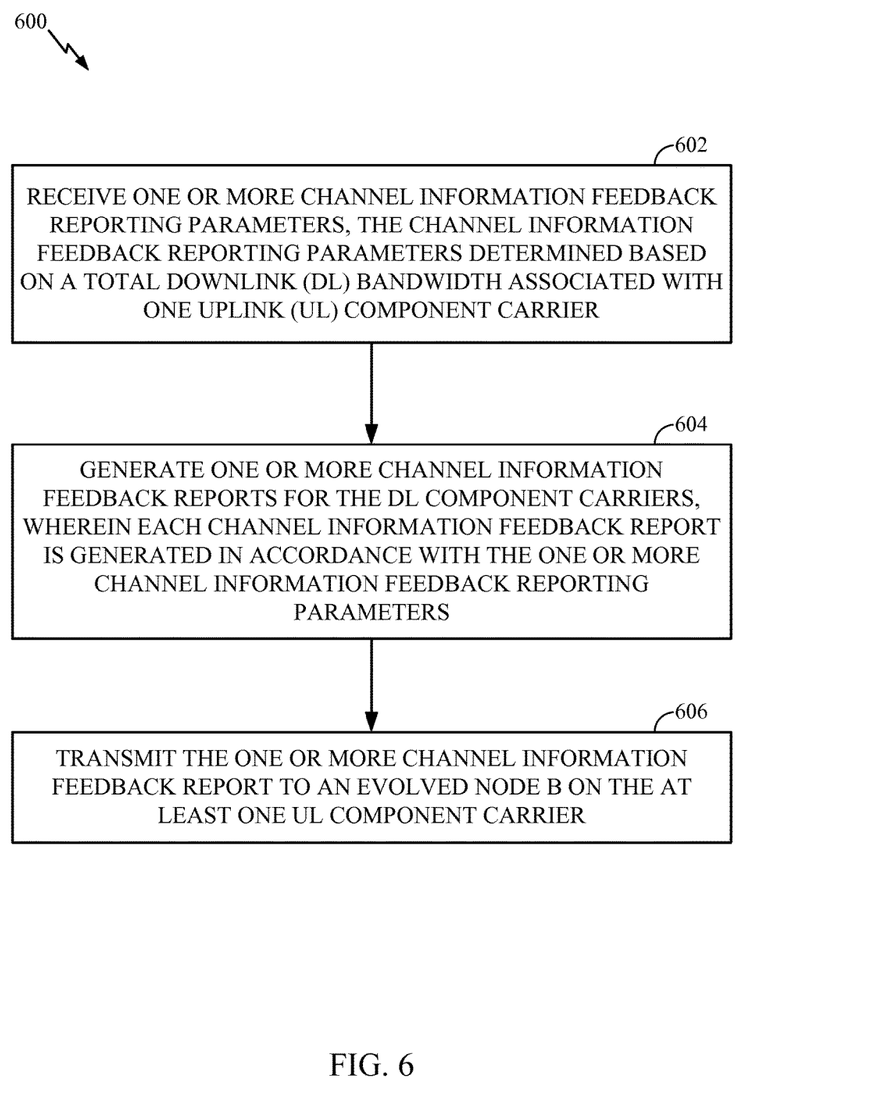
FIG. 6 illustrates an example operation that may be performed by an access terminal in accordance with certain aspects of the present disclosure.

FIG. 6 illustrates exemplary operations 600 that may be performed by a UE in accordance with aspects of the present disclosure. At 602, the UE may receive one or more CQI reporting parameters, wherein the CQI reporting parameters are determined based on a total DL bandwidth of a plurality of DL component carriers associated with at least one UL component carrier. Generally, an eNodeB controls the CQI reporting parameters to be used by a UE to report CQI, such as periodicity and/or frequency resolution. CQI parameters indicate a level of granularity on which to report channel quality. CQI parameters may comprise at least one of a sub-band size k, a bandwidth part J, or a preferred number of sub-bands M.

At 604, the UE may generate one or more CQI reports for the DL component carriers, wherein each CQI report is generated in accordance with the one or more CQI reporting parameters. In one aspect, the CQI may be a wideband CQI report, a higher-layer configured CQI report, or a User Equipment selected sub-band CQI report. In one aspect, the CQI report may be a periodic or aperiodic report. In one aspect, the UE may individually generate a CQI report for each of the plurality of DL component carriers.

At 606, the UE may transmit the one or more CQI reports to an eNodeB on the at least one UL component carrier. In one aspect, a periodic CQI report may be transmitted using PUCCH. It is acknowledged that if the UE needs to transmit UL data in the same subframe as the scheduled periodic CQI report, the periodic CQI report may be carried by PUSCH, together with UL data transmissions. In one aspect, an aperiodic CQI report may be transmitting using PUSCH, together with UL data, or by itself.

Figure 7:
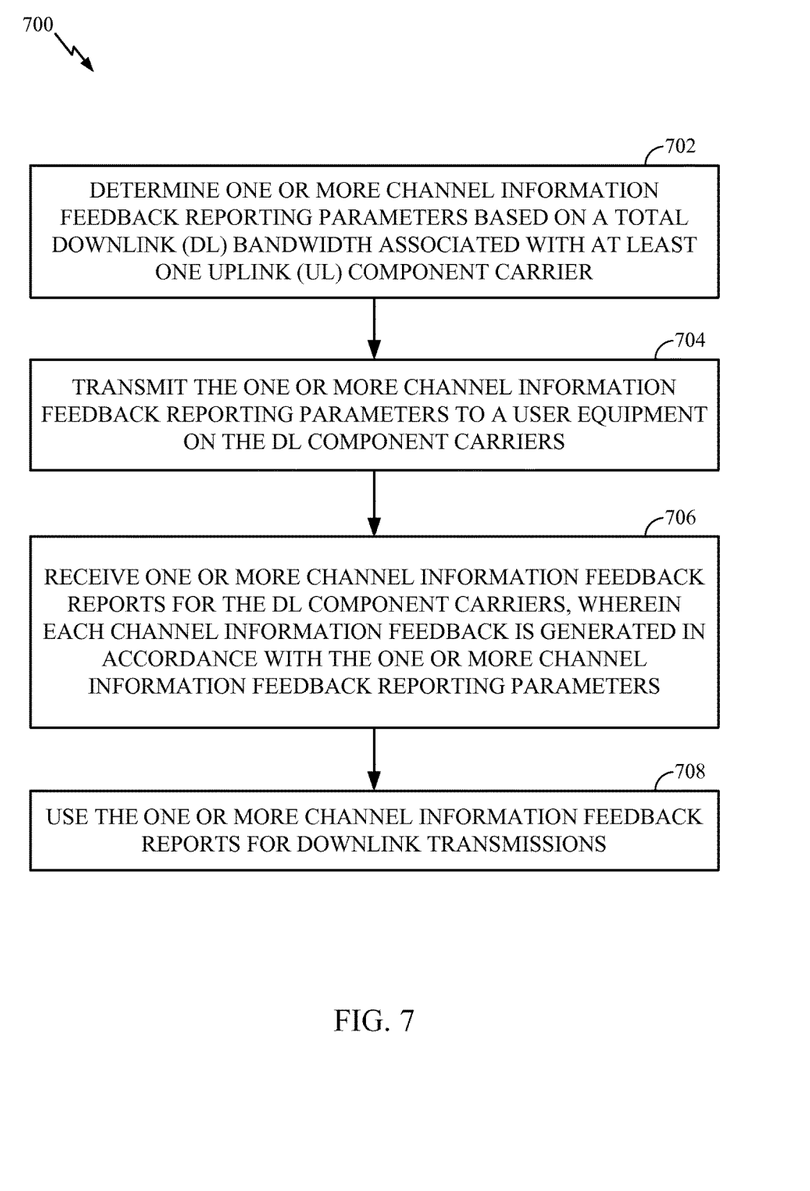
FIG. 7 illustrates an example operation that may be performed by an access point in accordance with certain aspects of the present disclosure.

FIG. 7 illustrates exemplary operations 700 that may be performed by an eNodeB. At 702, the eNodeB may determine one or more CQI reporting parameters based on a total DL bandwidth of a plurality of DL component carriers associated with at least one UL component carrier. In one aspect, the one or more CQI reporting parameters comprise at least one of a sub-band size k, a bandwidth part J, or a preferred number of M sub-bands on which to report.

In one specific aspect, where the total DL bandwidth $B^{DL}$ is less than 110 RBs, the eNodeB may determine the parameters k, J, and M as shown in Tables 1, 2, and 3. In another aspect, where the $B^{DL}$ is greater than 110 RBs, the Tables 1, 2, and 3 may be extended using similar principles. For example, one may extend Table 2 to create entries for total DL bandwidth $B^{DL}$ of sizes 111 to 210 RBs, 211 to 310 RBs, 311 to 410 RBs, and so forth, as shown below in Table 4. It is acknowledged that similar tables may be generated for parameters J and M.

TABLE 4

Exemplary LTE-A Sub-band Size (k) vs.
System Bandwidth, Modes 1-2, 3-0 and 3-1

| System Bandwidth $N_{RB}^{DL}$ | Sub-band Size (k) |
| --- | --- |
| 6-7 | NA |
| 8-10 | 4 |
| 11-26 | 4 |
| 27-63 | 6 |
| 64-110 | 8 |
| 111-210 | 12 |
| 211-310 | 16 |
| 311-410 | 20 |
| 411-550 | 24 |

At 704, the eNodeB may transmit the one or more CQI reporting parameters to a UE on the DL component carriers. In one aspect, the eNodeB may transmit the one or more CQI reporting parameters using any suitable means, for example, higher-laying signaling, RRC signaling, control channel messages, or data channel messages At 706, the eNodeB may receive one or more CQI reports for the DL component carriers, wherein each CQI report is generated in accordance with the one or more CQI reporting parameters. In one aspect, the eNodeB may receive a CQI report for each of the DL component carriers individually. In one aspect, the CQI report may comprise a wideband CQI report, a higher-layer configured CQI report, or a User Equipment selected sub-band CQI report. The CQI report may be periodic or aperiodic. In one aspect, the eNodeB may receive the CQI using PUCCH.

At 708, the eNodeB may use the received CQI report for downlink transmissions across the plurality of DL component carriers.

Figure 8:
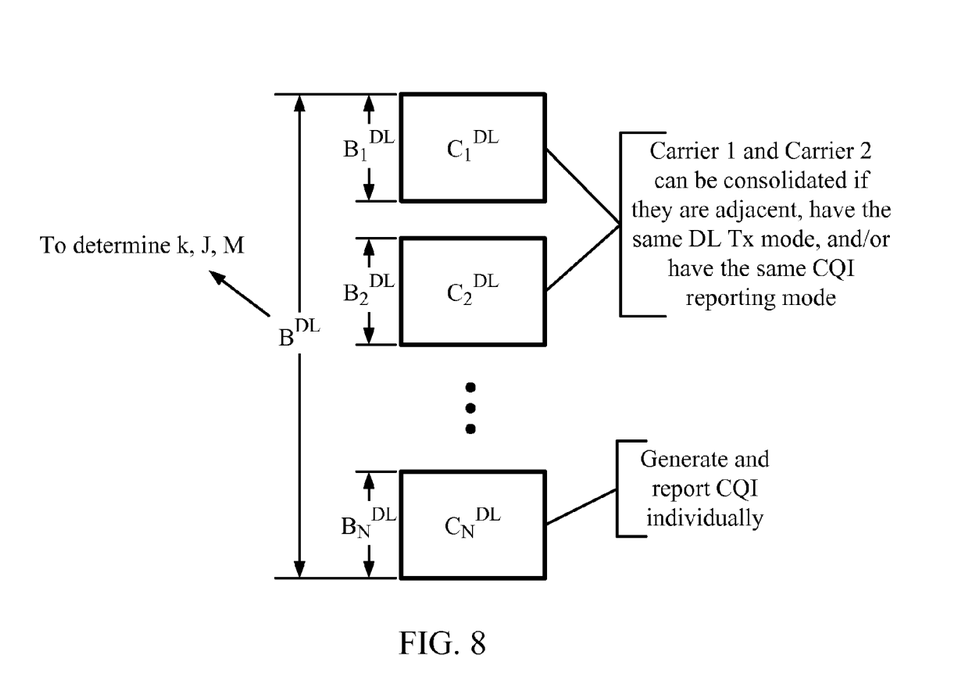
FIG. 8 is a block diagram illustrating exemplary uplink and downlink component carriers in accordance with certain aspects of the present disclosure

According to one aspect, generation of CQI reports of these component carriers may be consolidated and aggregated into a single carrier if two or more DL component carriers are adjacent and/or if the two or more component carriers are configured with the same DL transmission mode and/or CQI reporting mode, as illustrated by FIG. 8. In other words, a UE may generate at least one aggregated CQI report for at least two of the DL component carriers, wherein the at least two DL component carriers are at least one of adjacent or configured with the same DL transmission mode and/or CQI reporting mode. In one aspect, if all DL component carriers are adjacent, and/or all have the same DL transmission mode and/or CQI reporting mode, all component carriers can be aggregated and treated as a single carrier for CQI report purposes. In one aspect, the aggregation may be enabled or disabled on a per UE basis and may be signaled to the UE through any suitable means, such as higher-layer signaling.

Certain aspects of the discussed mechanism may be modified depending on particular associations of DL and UL component carriers. For example, if there are three DL component carriers and two UL component carriers, the discussed mechanism may be modified to determined the association (i.e., 2 DL:1 UL and 1 DL:1 UL), which may be cell-specific and UE-specific. It is also acknowledged that certain aspects of the discussed mechanism may be modified to include multiplexing of the different individual CQI reports on one UL.

It is further acknowledged that the certain aspects of the discussed mechanism may be extended to divide the M component carriers into M1, M2, . . . ML sets, such that $|M|_l \geq 1$ (each set has one or more component carriers), for $l=1, \ldots, L$ and $M1+M2+ \ldots +ML=M$. In one aspect, for each set $M_l$, parameters $k_l$, $J_l$, $M_l$ based on the total bandwidth of the component carriers in the set may be determined, and CQI/PMI/RI may be generated and reported individually (or using some aggregation as discussed above.) According to one aspect, a plurality of M component carriers may be divided into sets of one or more component carriers and an eNodeB may determine one or more CQI reporting parameters for each set.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method for reporting channel quality in a multiple carrier system, comprising:
   receiving higher-layer signaling that enables a carrier aggregation configuration that includes a plurality of downlink (DL) carriers configured in an asymmetric configuration with an uplink (UL) carrier, wherein the UL carrier is configured with a physical uplink channel to carry channel information feedback reports for the plurality of DL carriers;
   receiving one or more channel information feedback reporting parameters, the one or more channel information feedback reporting parameters determined based on a total DL bandwidth of the plurality of DL carriers of the carrier aggregation configuration being within a DL bandwidth range of a plurality of DL bandwidth ranges;
   selecting, by a user equipment (UE), a number of sub-bands based on the total DL bandwidth being within the DL bandwidth range of the plurality of DL bandwidth ranges;
   determining a quality value for each of the selected sub-bands and a quality indicator value that is a function of the determined quality values;
   generating one or more channel information feedback reports for the plurality of DL carriers of the carrier aggregation configuration, wherein at least one of the one or more channel information feedback reports includes the quality indicator value, and wherein each channel information feedback report is generated in accordance with the one or more channel information feedback reporting parameters; and
   transmitting, on the physical uplink channel, the one or more channel information feedback reports for the plurality of DL carriers of the carrier aggregation configuration to an evolved NodeB (eNodeB).

2. The method of claim 1, wherein the one or more channel information feedback reporting parameters comprise at least one of a sub-band size, a bandwidth part, or a preferred number of sub-bands on which to report.

3. The method of claim 1, wherein the one or more channel information feedback reports comprise a User Equipment selected sub-band channel quality indicator (CQI) report.

4. The method of claim 1, wherein the physical uplink channel comprises a Physical Uplink Shared Channel or a Physical Uplink Control Channel.

5. The method of claim 1, wherein the transmitting comprises transmitting an index of the selected sub-bands.

6. The method of claim 1, wherein the generating comprises generating at least one aggregated channel information feedback report for at least two of the plurality of DL carriers corresponding to first and second sub-bands of the number of sub-bands selected based on the total DL bandwidth, wherein the at least two of the plurality of DL carriers comprise a bandwidth less than a carrier system bandwidth and are at least one of adjacent carriers or carriers configured with the same DL transmission mode and/or channel quality indicator (CQI) reporting mode.

7. The method of claim 6, wherein generating at least one aggregated channel information feedback report may be enabled on a per UE basis.

8. The method of claim 1, wherein a plurality of M carriers are divided into sets of one or more carriers and the determining comprises determining one or more channel information feedback reporting parameters for each set.

9. An apparatus for reporting channel quality in a multiple carrier system, comprising:
   one or more processors configured for:
   receiving higher-layer signaling that enables a carrier aggregation configuration that includes a plurality of downlink (DL) carriers configured in an asymmetric configuration with an uplink (UL) carrier, wherein the UL carrier is configured with a physical uplink channel to carry channel information feedback reports for the plurality of DL carriers;
   receiving one or more channel information feedback reporting parameters, the one or more channel information feedback reporting parameters determined based on a total DL bandwidth of the plurality of DL carriers of the carrier aggregation configuration being within a DL bandwidth range of a plurality of DL bandwidth ranges;
   selecting, by a user equipment (UE), a number of sub-bands based on the total DL bandwidth being within the DL bandwidth range of the plurality of DL bandwidth ranges;
   determining a quality value for each of the selected sub-bands and a quality indicator value that is a function of the determined quality values;
   generating one or more channel information feedback reports for the plurality of DL carriers of the carrier aggregation configuration, wherein at least one of the one or more channel information feedback reports includes the quality indicator value, and wherein each channel information feedback report is generated in accordance with the one or more channel information feedback reporting parameters; and transmitting, on the physical uplink channel, the one or more channel information feedback reports for the plurality of DL carriers of the carrier aggregation configuration to an evolved NodeB (eNodeB); and memory coupled to the one or more processors.

10. The apparatus of claim 9, wherein the one or more channel information feedback reporting parameters comprise at least one of a sub-band size, a bandwidth part, or a preferred number of sub-bands on which to report.

11. The apparatus of claim 9, wherein the one or more channel information feedback reports comprise a User Equipment selected sub-band channel quality indicator (CQI) report.

12. The apparatus of claim 9, wherein the physical uplink channel comprises a Physical Uplink Shared Channel or a Physical Uplink Control Channel.

13. The apparatus of claim 9, wherein the transmitting comprises transmitting an index of the selected sub-bands.

14. The apparatus of claim 9, wherein the one or more processors is further configured for:
generating at least one aggregated channel information feedback report for at least two of the plurality of DL carriers corresponding to first and second sub-bands of the number of sub-bands selected based on the total DL bandwidth, wherein the at least two of the plurality of DL carriers comprise a bandwidth less than a carrier system bandwidth and are at least one of adjacent carriers or carriers configured with the same DL transmission mode and/or channel quality indicator (CQI) reporting mode.

15. The apparatus of claim 14, wherein the one or more processors is further configured to generate the at least one aggregated channel information feedback report on a per UE basis.

16. The apparatus of claim 9, wherein a plurality of M carriers are divided into sets of one or more carriers and the determining comprises determining one or more channel information feedback reporting parameters for each set.

17. An apparatus for reporting channel quality in a multiple carrier system, comprising:
means for receiving higher-layer signaling that enables a carrier aggregation configuration that includes a plurality of downlink (DL) carriers configured in an asymmetric configuration with an uplink (UL) carrier, wherein the UL carrier is configured with a physical uplink channel to carry channel information feedback reports for the plurality of DL carriers;
means for receiving one or more channel information feedback reporting parameters, the one or more channel information feedback reporting parameters determined based on a total DL bandwidth of the plurality of DL carriers of the carrier aggregation configuration being within a DL bandwidth range of a plurality of DL bandwidth ranges;
means for selecting, by a user equipment (UE), a number of sub-bands based on the total DL bandwidth being within the DL bandwidth range of the plurality of DL bandwidth ranges;
means for determining a quality value for each of the selected sub-bands and a quality indicator value that is a function of the determined quality values;
means for generating one or more channel information feedback reports for the plurality of DL carriers of the carrier aggregation configuration, wherein at least one of the one or more channel information feedback reports includes the quality indicator value, and wherein each channel information feedback report is generated in accordance with the one or more channel information feedback reporting parameters; and
means for transmitting, on the physical uplink channel, the one or more channel information feedback reports for the plurality of DL carriers of the carrier aggregation configuration to an evolved NodeB (eNodeB).

18. The apparatus of claim 17, wherein the one or more channel information feedback reporting parameters comprise at least one of a sub-band size, a bandwidth part, or a preferred number of sub-bands on which to report.

19. The apparatus of claim 17, wherein the one or more channel information feedback reports comprise a User Equipment selected sub-band channel quality indicator (CQI) report.

20. The apparatus of claim 17, wherein the physical uplink channel comprises a Physical Uplink Shared Channel or a Physical Uplink Control Channel.

21. The apparatus of claim 17, further comprising means for transmitting an index of the selected sub-bands.

22. The apparatus of claim 17, wherein the means for generating comprises means for generating at least one aggregated channel information feedback report for at least two of the plurality of DL carriers corresponding to first and second sub-bands of the number of sub-bands selected based on the total DL bandwidth, wherein the at least two of the plurality of DL carriers comprise a bandwidth less than a carrier system bandwidth and are at least one of adjacent carriers or carriers configured with the same DL transmission mode and/or channel quality indicator (CQI) reporting mode.

23. The apparatus of claim 22, wherein the means for generating at least one aggregated channel information feedback report may be enabled on a per UE basis.

24. The apparatus of claim 17, wherein a plurality of M carriers are divided into sets of one or more carriers and the determining comprises determining one or more channel information feedback reporting parameters for each set.

25. A non-transitory computer readable medium having instructions stored thereon, the instructions being executable by one or more processors and the instructions comprising:
instructions for receiving higher-layer signaling that enables a carrier aggregation configuration that includes a plurality of downlink (DL) carriers configured in an asymmetric configuration with an uplink (UL) carrier, wherein the UL carrier is configured with a physical uplink channel to carry channel information feedback reports for the plurality of DL carriers;
instructions for receiving one or more channel information feedback reporting parameters, the one or more channel information feedback reporting parameters determined based on a total DL bandwidth of the plurality of DL carriers of the carrier aggregation configuration being within a DL bandwidth range of a plurality of DL bandwidth ranges;
instructions for selecting, by a user equipment (UE), a number of sub-bands based on the total DL bandwidth being within the DL bandwidth range of the plurality of DL bandwidth ranges;
instructions for determining a quality value for each of the selected sub-bands and a quality indicator value that is a function of the determined quality values;
instructions for generating one or more channel information feedback reports for the plurality of DL carriers of the carrier aggregation configuration, wherein at least one of the one or more channel information feedback reports includes the quality indicator value, and wherein each channel information feedback report is generated in accordance with the one or more channel information feedback reporting parameters; and instructions for transmitting, on the physical uplink channel, the one or more channel information feedback reports for the plurality of DL carriers of the carrier aggregation configuration to an evolved Node B (eNodeB).

26. A method for reporting channel quality in a multiple carrier system, comprising:

transmitting higher-layer signaling that enables a carrier aggregation configuration that includes a plurality of downlink (DL) carriers configured in an asymmetric configuration with an uplink (UL) carrier, wherein the UL carrier is configured with a physical uplink channel to carry channel information feedback reports for the plurality of DL carriers;

determining one or more channel information feedback reporting parameters based on a total DL bandwidth of the plurality of DL carriers of the carrier aggregation configuration being within a DL bandwidth range of a plurality of DL bandwidth ranges;

transmitting the one or more channel information feedback reporting parameters to a user equipment (UE) on the plurality of DL carriers of the carrier aggregation configuration;

receiving, on the physical uplink channel, one or more channel information feedback reports for the plurality of DL carriers of the carrier aggregation configuration, wherein at least one of the one or more channel information feedback reports includes a quality indicator value that is a function of quality values determined for a number of UE-selected sub-bands selected based on the total DL bandwidth being within the DL bandwidth range of the plurality of DL bandwidth ranges, and wherein each channel information feedback report is generated by the UE in accordance with the one or more channel information feedback reporting parameters; and using the one or more channel information feedback reports for downlink transmission to the UE.

27. The method of claim 26, wherein the one or more channel information feedback reporting parameters comprise at least one of a sub-band size, a bandwidth part, or a preferred number of sub-bands on which to report.

28. The method of claim 26, wherein the one or more channel information feedback reports comprise a User Equipment selected sub-band channel quality indicator (CQI) report.

29. The method of claim 26, wherein the physical uplink channel comprises a Physical Uplink Shared Channel or a Physical Uplink Control Channel.

30. The method of claim 26, wherein the receiving comprises receiving an index of the selected sub-bands.

31. An apparatus for reporting channel quality in a multiple carrier system, comprising:

one or more processors configured for:

transmitting higher-layer signaling that enables a carrier aggregation configuration that includes a plurality of downlink (DL) carriers configured in an asymmetric configuration with an uplink (UL) carrier, wherein the UL carrier is configured with a physical uplink channel to carry channel information feedback reports for the plurality of DL carriers;

determining one or more channel information feedback reporting parameters based on a total DL bandwidth of the plurality of DL carriers of the carrier aggregation configuration being within a DL bandwidth range of a plurality of DL bandwidth ranges;

transmitting the one or more channel information feedback reporting parameters to a user equipment (UE) on the plurality of DL carriers of the carrier aggregation configuration;

receiving, on the physical uplink channel, one or more channel information feedback reports for the plurality of DL carriers of the carrier aggregation configuration, wherein at least one of the one or more channel information feedback reports includes a quality indicator value that is a function of quality values determined for a number of UE-selected sub-bands selected based on the total DL bandwidth being within the DL bandwidth range of the plurality of DL bandwidth ranges, and wherein each channel information feedback report is generated by the UE in accordance with the one or more channel information feedback reporting parameters; and using the one or more channel information feedback reports for downlink transmission to the UE; and memory coupled to the one or more processors.

32. The apparatus of claim 31, wherein the one or more channel information feedback reporting parameters comprise at least one of a sub-band size, a bandwidth part, or a preferred number of sub-bands on which to report.

33. The apparatus of claim 31, wherein the one or more channel information feedback reports comprise a User Equipment selected sub-band channel quality indicator (CQI) report.

34. The apparatus of claim 31, wherein the physical uplink channel comprises a Physical Uplink Shared Channel or a Physical Uplink Control Channel.

35. The apparatus of claim 31, wherein the receiving comprises receiving an index of the selected sub-bands.

36. An apparatus for reporting channel quality in a multiple carrier system, comprising:

means for transmitting higher-layer signaling that enables a carrier aggregation configuration that includes a plurality of downlink (DL) carriers configured in an asymmetric configuration with an uplink (UL) carrier, wherein the UL carrier is configured with a physical uplink channel to carry channel information feedback reports for the plurality of DL carriers;

means for determining one or more channel information feedback reporting parameters based on a total DL bandwidth of the plurality of DL carriers of the carrier aggregation configuration being within a DL bandwidth range of a plurality of DL bandwidth ranges;

means for transmitting the one or more channel information feedback reporting parameters to a user equipment (UE) on the plurality of DL carriers of the carrier aggregation configuration;

means for receiving, on the physical uplink channel, one or more channel information feedback reports for the plurality of DL carriers of the carrier aggregation configuration, wherein at least one of the one or more channel information feedback reports includes a quality indicator value that is a function of quality values determined for a number of UE-selected sub-bands selected based on the total DL bandwidth being within the DL bandwidth range of the plurality of DL bandwidth ranges, and wherein each channel information feedback report is generated by the UE in accordance with the one or more channel information feedback reporting parameters; and means for using the one or more channel information feedback reports for downlink transmission to the UE.

37. The apparatus of claim 36, wherein the one or more channel information feedback reporting parameters comprise at least one of a sub-band size, a bandwidth part, or a preferred number of sub-bands on which to report.

38. The apparatus of claim 36, wherein the one or more channel information feedback reports comprise a User Equipment selected sub-band channel quality indicator (CQI) report.

39. The apparatus of claim 36, wherein the physical uplink channel comprises a Physical Uplink Shared Channel or a Physical Uplink Control Channel.

40. The apparatus of claim 36, further comprising means for receiving an index of the selected sub-bands.

41. A computer-program product for reporting channel quality in a multiple carrier system, comprising a non-transitory computer readable medium having instructions stored thereon, the instructions being executable by one or more processors and the instructions comprising:

instructions for transmitting higher-layer signaling that enables a carrier aggregation configuration that includes a plurality of downlink (DL) carriers configured in an asymmetric configuration with an uplink (UL) carrier, wherein the UL carrier is configured with a physical uplink channel to carry channel information feedback reports for the plurality of DL carriers;

instructions for determining one or more channel information feedback reporting parameters based on a total DL bandwidth of the plurality of DL carriers of the carrier aggregation configuration being within a DL bandwidth range of a plurality of DL bandwidth ranges;

instructions for transmitting the one or more channel information feedback reporting parameters to a user equipment (UE) on the plurality of DL carriers of the carrier aggregation configuration;

instructions for receiving, on the physical uplink channel, one or more channel information feedback reports for the plurality of DL carriers, wherein at least one of the one or more channel information feedback reports includes a quality indicator value that is a function of quality values determined for a number of UE-selected sub-bands selected based on the total DL bandwidth being within the DL bandwidth range of the plurality of DL bandwidth ranges, and wherein each channel information feedback report is generated by the UE in accordance with the one or more channel information feedback reporting parameters; and instructions for using the one or more channel information feedback reports for downlink transmission to the UE.

* * * * *